United States Patent [19]

Blanchard et al.

[11] Patent Number: 4,866,321
[45] Date of Patent: Sep. 12, 1989

[54] BRUSHLESS ELECTRICAL MACHINE FOR USE AS MOTOR OR GENERATOR

[75] Inventors: Hubert J. Blanchard; Cornelius J. Fruge, both of Mamou, La.

[73] Assignee: William C. Lamb, Lafayette, La.

[21] Appl. No.: 714,801

[22] Filed: Mar. 26, 1985

[51] Int. Cl.$^4$ .................... H02K 21/12; H02K 19/16
[52] U.S. Cl. .................................. 310/112; 310/126; 310/156
[58] Field of Search ............... 310/43, 156, 268, 112, 310/114, 124, 126

[56] References Cited

U.S. PATENT DOCUMENTS

| | | | |
|---|---|---|---|
| 2,437,142 | 3/1948 | Welch | 172/275 |
| 2,951,957 | 9/1960 | Eigeman | 310/164 |
| 3,014,141 | 12/1961 | Riggs | 310/156 |
| 3,354,332 | 11/1967 | Bonnefoy | 310/268 |
| 3,543,066 | 11/1970 | French | 310/186 |
| 3,665,227 | 5/1972 | Busch | 310/46 |
| 3,670,189 | 6/1972 | Monroe | 310/46 |
| 3,686,521 | 8/1972 | Henry-Baudot | 310/268.6 |
| 3,790,834 | 2/1974 | Tanaka | 310/162 |
| 3,832,581 | 8/1974 | Hoffmann et al. | 310/268 X |
| 3,922,574 | 11/1975 | Whiteley | 310/156 |
| 3,979,619 | 9/1976 | Whiteley | 310/268 |
| 3,999,092 | 12/1976 | Whiteley | 310/156 |
| 4,127,785 | 11/1978 | Noguchi | 310/89 |
| 4,187,441 | 2/1980 | Oney | 310/112 |
| 4,194,743 | 3/1980 | Ohsawa et al. | 274/1 E |
| 4,243,902 | 1/1981 | Ban et al. | 310/154 |
| 4,297,604 | 10/1981 | Tawse | 310/268 X |
| 4,315,177 | 2/1982 | Ban | 310/268 X |
| 4,315,178 | 2/1982 | Ban | 310/268 X |
| 4,336,475 | 6/1982 | Morinaga et al. | 310/198 |
| 4,357,550 | 11/1982 | Müller | 310/43 |
| 4,358,693 | 11/1982 | Palmer et al. | 310/46 |
| 4,477,745 | 10/1984 | Lux | 310/268 X |
| 4,605,874 | 8/1986 | Whiteley | 310/268 |
| 4,634,912 | 1/1987 | Heyraud | 310/268 |

FOREIGN PATENT DOCUMENTS

| | | | |
|---|---|---|---|
| 1080677 | 4/1960 | Fed. Rep. of Germany | 310/156 |
| 2006542 | 5/1979 | United Kingdom | 310/112 |

OTHER PUBLICATIONS

IEEE Transactions on Power Apparatus and Systems, vol. PAS-99, No. 6, Nov./Dec. 1980.
IEEE Transaction on Power Apparatus and Systems, vol. PAS-101, No. 4, Apr. 1982.

*Primary Examiner*—Patrick R. Salce
*Assistant Examiner*—Judson H. Jones
*Attorney, Agent, or Firm*—Arnold, White & Durkee

[57] ABSTRACT

A brushless electrical machine has a stator assembly with spaced coils and a rotor assembly with spaced permanent magnets and with axial air gaps between the assemblies. The magnets define rotatable flux-producing modules and the coils are in positions adjacent to the paths of travel of the magnets. The machine can be operated as a low speed, high torque motor or as a low speed, high power output generator with output characteristics proportional to the number of axially interleaved stator and rotor assemblies.

16 Claims, 4 Drawing Sheets

Fig. 5

BRUSHLESS ELECTRICAL MACHINE FOR USE AS MOTOR OR GENERATOR

This invention pertains generally to an axial air gap, brushless electric machine having alternate stators and rotors. Each stator has a plurality of bobbin-type coils distributed about its periphery. Each rotor has a plurality of permanent magnet discs about its periphery which rotate past the coils of adjacent stators. The machines may be used as motors or generators. They are especially characterized by their light weight and structural flexibility.

BACKGROUND OF THE INVENTION

An industrial need exists for a low cost, high torque-to-weight ratio, brushless electrical motor capable of operating at relatively low speeds, typically under 800 rpm. Such motors, when operated as vehicle traction motors for example, can eliminate the need for both mechanical transmissions and differentials. The motors also have application in servo systems used in robotics and other motion control devices which are gear limited in design.

A need also exists for a low cost, high power electrical generator capable of operating at low speeds, typically under 300 rpm. Such generators may be directly wind-driven by large propellers; they may also be directly driven by water wheels or turbines in streams or dams. It is also contemplated these generators will be able to greatly reduce the need for mechanical gearing, which in typical wind power generation systems can cost more than the generator. Some of these require high efficiency conversion of motive power to electrical power. Rather, the initial cost and the cost of maintenance become the more important factors.

Brushless design of motors requires that stator windings be mounted in a stationary fashion and that rotors be fastened to a shaft for rotary motion. In the past, the stator assembly of a brushless electrical motor has been mounted inside a housing or yoke. The housing or yoke serves no energy conversion function, but it maintains stator alignment and concentricity with the rotor shaft. Elimination of most of the housing would help to realize increased torque-to-weight ratios.

Magnets deliver usable flux in relation to the operating point $B_D$ of the magnets. Magnetic circuits that have flux paths which are always aiding in series with the individual magnet polarities provide a higher operating point $B_D$ than circuits which cause the magnets to be in opposition or which have magnetic flux paths with high reluctance. Further, the greater the flux density per unit mass of magnet, the greater the torque-to-weight ratio will be for the entire machine, other parameters remaining the same.

SUMMARY OF THE INVENTION

It is a general object of the invention to provide an electrical machine which can serve as a motor or a generator. The machine is characterized by high torque/mass ratios, simple but rugged construction, and ease of repair. The machine is versatile in that it is easy to assemble and disassemble, and its capacity is readily changed. It can operate at relatively low speeds, and it is especially suited for use in remote areas.

The present machine is brushless and has a stator which has a plurality of coils wound on bobbin-like cores. The machine also has a rotor with a plurality of permanent magnet discs. There are axial air gaps between the stators and the rotors. The machine is modular in construction in that it is an assembly of stators held together by rods or equivalent means. The machine is also low in mass in that the rotors and stators are both made of strong, lightweight, synthetic, dielectric materials—preferably polycarbonate resins. Both the stators and the rotors are basically disk-like in appearance.

The bobbin coils and the permanent magnets are spaced around the peripheries of the stators and rotors, respectively. Rotation of the rotors causes the magnets to pass by the coils in rapid sequence. The number of coils in relation to the number of magnets should be in a five-to-eight ratio. The magnets in all of the rotors should be in axial alignment as should be the coils in all of the stators. The coils are mounted in the stators in a manner to be accessed and replaced.

Figure 1:
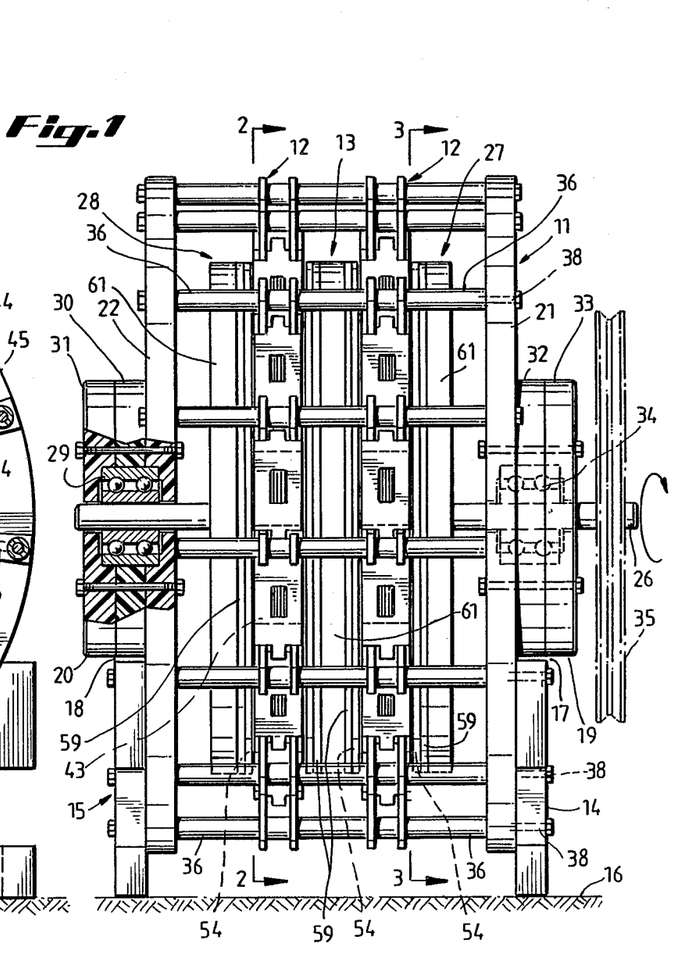
FIG. 1 is a side view, in partial section, of an embodiment of the invention with two sets of stationary stator windings, two end-piece rotating magnetic rotors and one double-sided magnetic rotor.

A preferred embodiment of the invention is broadly denoted by the numeral 11 in FIG. 1. The machine shown there can form either a motor or a generator; however, for purposes of present illustration, it will be referred to as a motor.

The machine in FIG. 1 is simple in that it comprises two stators and three rotors, one of the rotors being a double-sided rotor. It will be noted, however, that larger machines can be readily made by adding additional stators and interposing them between additional double-sided magnetic rotors. The addition of an additional stator and a double-sided magnetic rotor may be referred to as the addition of a stack. The addition of stacks results in a machine which increases in length end-to-end. The addition of stacks also serves to increase the power generated in a generator and the horsepower rating in a motor.

Motor 11 comprises end supports 14 and 15 with flat bottoms which bear on surface 16. The tops of supports 14 and 15 have semicircular recesses to fit against the shaft-bearing housings 19 and 20, respectively. Housing 19 comprises bearing support members 32 and 33, and housing 20 comprises bearing support members 30 and 31.

End supports 14 and 15 are bolted to motor housing end members 21 and 22. Motor housing end members 21 and 22 are preferably circular in configuration and of the same diameter as stators 12. Motor housing end members 21 and 22 are also preferably constructed of polycarbonate plastic; however, any material having structural rigidity and dielectric properties similar to or greater than polycarbonates may also be used. One such type of polycarbonate material is Lexan manufactured by General Electric.

Rotor shaft 26 penetrates the entire machine assembly 11, including motor housing end members 21 and 22, stationary stator members 12, end piece rotating magnetic rotors 27 and 28 and double-sided magnetic rotor member 13. Shaft 26 is supported at one end by bearing 29 enclosed in bearing support members 30 and 31. In a similar manner bearing support members 32 and 33 support bearing 34. Bearing support members 32 and 33 are circular in the preferred embodiment; however, this configuration is not critical. Bearing support members 30, 31, 32 and 33 are preferably made of polycarbonate plastic because of its strength and light weight; however, any material with similar structural and dielectric properties may be utilized. Bearing support members 32 and 33 are bolted to motor housing end member 21. In a similar manner bearing support members 30 and 31 are bolted to motor housing end-member 22.

The shaft 26 is rigidly connected to end rotors 27 and 28 and double-sided central rotor 13. Shaft 26 is free to rotate relative to stators 12. This physical arrangement in a motor configuration permits the rotors 27, 28 and 13 to deliver rotational energy to shaft 26 with a translation of this energy to pulley 35 which is conveniently belt-coupled to the load to be driven. Alternatively, pulley 35 may be removed and shaft 26 direct coupled to a load, either directly or through a transmission.

In a generator configuration, power is delivered to shaft 26 either directly or as through pulley 35. The rotating forces are consequently delivered to end rotors 27 and 28 and double-sided magnetic rotor members 13. This rotating force results in a rotating magnetic field which is transferred by transformer action to stators 12. The variations in magnetic flux in the coils of stators 12 result in electrical energy delivered to the generator terminals.

Referring to FIG. 1, end rotors 27 and 28 and double-sided magnetic rotor member 13 are circular in configuration with an outside diameter less than motor housing end members 21 and 22 and stators 12. The outside diameters of motor housing end members 21 and 22 are the same as the outside diameter of stators 12. The smaller diameters of the rotors 27, 28 and 13 permit the shaft 26 and rotating structures to rotate without interfering with spacers 36.

Figure 2:
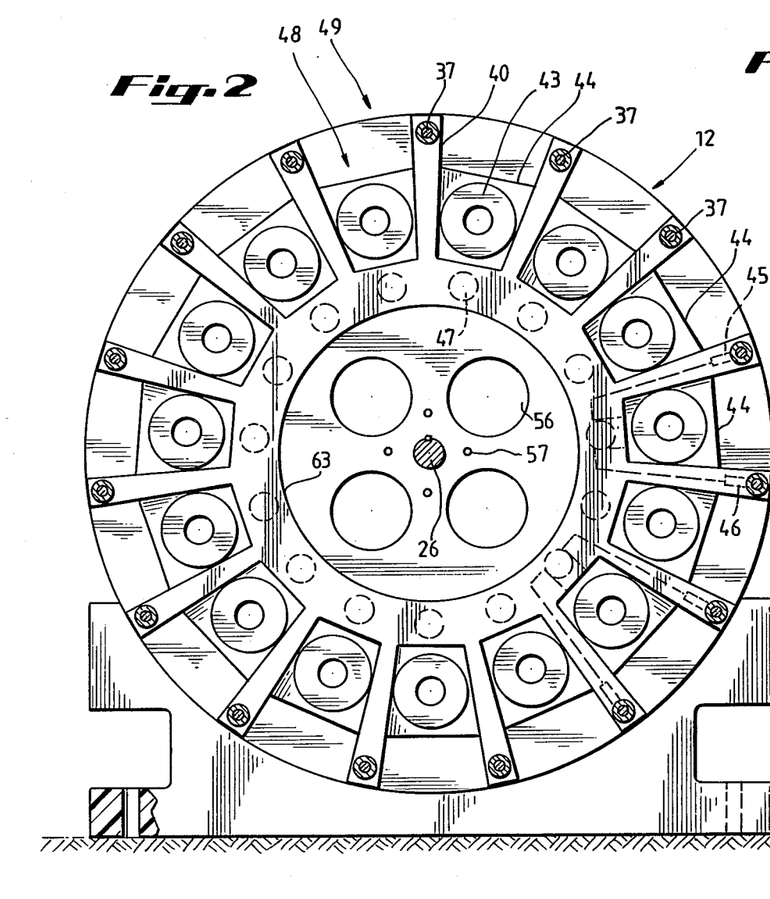
FIG. 2 is a section taken along section lines 2—2 of FIG. 1, illustrating the layout of the bobbin coils.

Spacers 36 are disposed about the circumference of the motor 11 in a circular configuration about end housing members 21 and 22 and stators 12. Referring to FIG. 2, the positioning of spacers 36 around the circumference of stator 12 is designated by accurately spaced spacer holes 37. Each spacer member 36 is a hollow tubular member designed to accommodate through-bolts 38. Through-bolts 38 are parallel to the axis of the machine (parallel to shaft 26), and are circumferentially disposed about housing end members 21 and 22 and stator 12. Through-bolts 38 in essence hold the machine together. Additionally, through-bolts 38 hold spacers 36 in position by restraining any displacement in a radial or longitudinal direction.

Referring to FIG. 2, an elevational view of stator 12 is illustrated. This view is taken along section lines 2—2 of FIG. 1. Fifteen bobbin coils 43 are longitudinally inserted into separate bobbin insertion pieces 44. Each bobbin insertion piece 44 is wedge-shaped and is restrained in its proper axial position by a post 47. Additionally each bobbin insertion piece is restrained between two wedge-shaped arms. Thus, bobbin insertion piece 44 in FIG. 2 is locked between arms 45 and 46. Arms 46 are held in place by through-bolts 38. Additionally, bobbin 43 and bobbin insertion piece 44 are restrained in the longitudinal direction by stator walls 48 and 49 (illustrated in FIG. 5).

Again referring to FIG. 2, fifteen bobbin coil members 43 are circumferentially disposed about stator 12. It can be appreciated from the foregoing disclosure that for larger machines with larger diameter stators 12, more bobbin coil members 43 may be accommodated.

The modular nature of the present invention enables the ready removal and replacement of bobbin coils 43 without complete disassembly of the machine. This is accomplished by removal of the two through-bolts 38 adjacent the bobbin insertion piece 44 of the bobbin coil 43 to be replaced. Once the through-bolts 38 have been removed, the bobbin insertion piece blocking spacers 45 and 46 are withdrawn radially. Once the bobbin insertion piece blocking spacers 45 and 46 have been removed, the bobbin insertion piece 44 may be withdrawn—also in a radial direction. After the bobbin insertion piece 44 has been withdrawn from the machine, the bobbin coil 43 may be removed in a longitudinal direction. A new bobbin coil member 43 may then be inserted, and the above-described steps repeated in reverse order. Thus, a single bobbin coil may be replaced without total disassembly of the machine.

Figures 3, 4, 6:
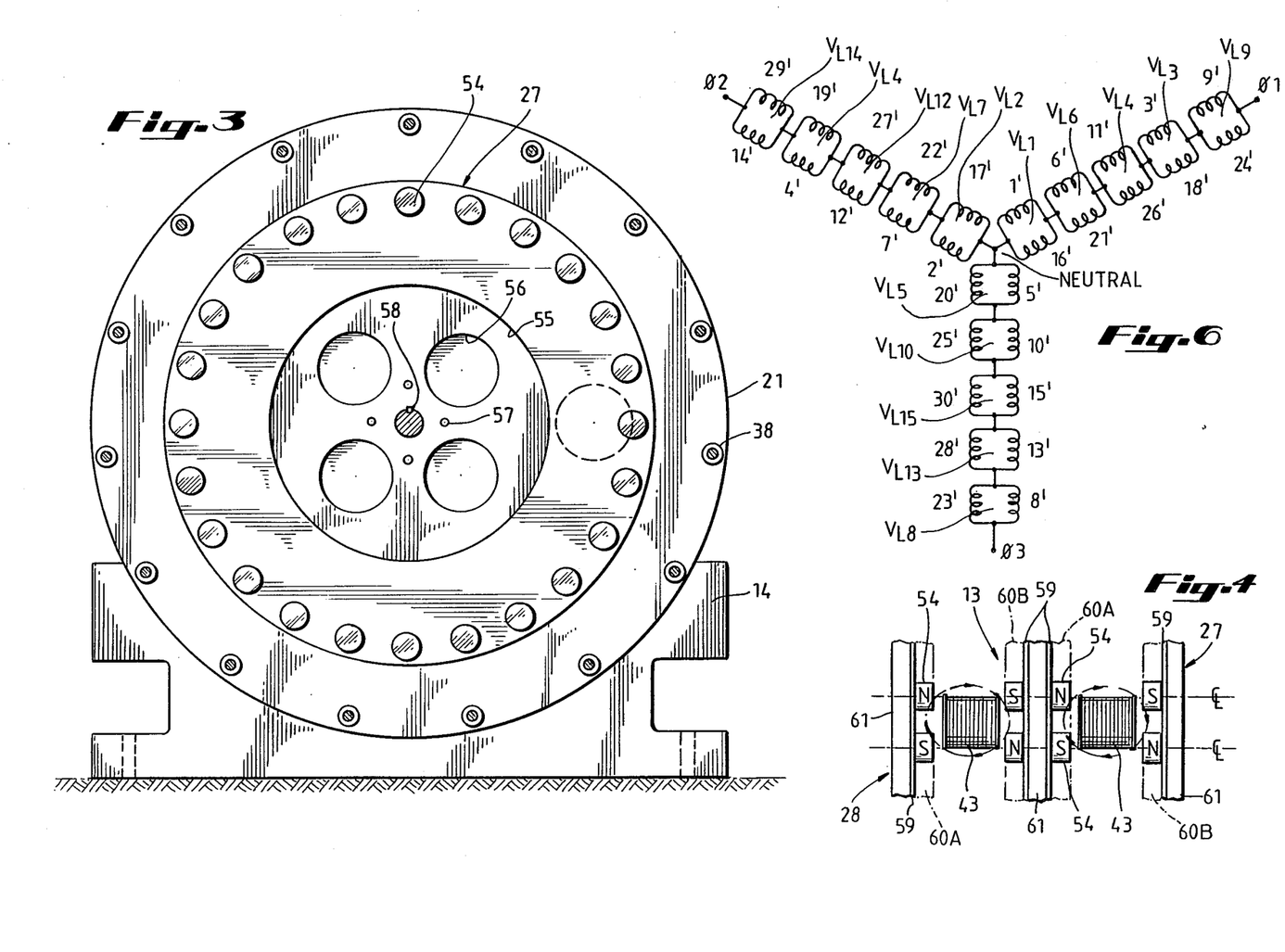
FIG. 3 is a section taken along section lines 3—3 of FIG. 1 illustrating the layout of the magnetic rotors and their rotating magnets.
FIG. 4 is a partial section of the inter-leaved bobbin coils and permanent magnets illustrating the flow of magnetic flux lines.
FIG. 6 is a winding connection diagram for a three-phase machine.

Referring next to FIG. 3, a sectional view of FIG. 1 taken along section lines 3—3 is illustrated. For reference purposes, support member 14 is shown in the background as well as motor housing end member 21. Also shown for reference purposes are through-bolts 38 and bolt holes 37 circumferentially spaced about housing end member 21. End rotor 27 is illustrated with rare earth magnets 54 circumferentially spaced about the rotor. Also illustrated is rotor spacer 55. Rotor spacer 55 has a plurality of longitudinal holes 56 which aid in the ventilation of the machine as well as minimize its weight. Rotor spacer 55 has a plurality of assembly holes 57 as well as a shaft hole 58 to accommodate shaft 26 which penetrates the machine longitudinally. Rotor spacer 55 is preferably constructed of polycarbonate resins; however, any material with similar dielectric and structural properties may be used.

The rare earth magnets 54 are circular in configuration. This configuration is less expensive to manufacture and produces a sharper flux change in the bobbin coils 43, thereby producing more power for a generator and delivering more torque in a motor.

Referring to FIG. 3, twenty-four magnets are illustrated about the circumference of end piece rotor 27. Adjacent magnets on the same side of any given rotor are opposite in polarity. Similarly, magnets which are in axial alignment with one another, and which are back-to-back on the same rotor or face one another on adjacent rotors, are also opposite in polarity. The machine disclosed herein is designed to operate at speeds from 300 RPM to 800 RPM. The machine's synchronous speed at 60 Hertz is 300 RPM for the 24 pole machine described herein. However, when operated as a generator, the machine generates 60 Hz electric power at 300 RPM.

It has been discovered that the preferable coil to magnet ratio is five to eight (5:8). This ratio has been found to be more efficient and balanced than other ratios. Specific examples of satisfactory machine designs include coil to magnet ratios of 5 to 8, 15 to 24, 30 to 48, 45 to 72 and so on. The ratio of 15 to 24 in the prototype machine is deemed a limiting configuration only by the diameter of the machine. Thus, as the machine diameter is increased the number of bobbin coils and magnets may be increased. Similarly as the diameter of the machine is decreased, the number of bobbin coils 43 and magnets 54 may be decreased. However, the ratio of five to eight should be maintained.

The object of a five to eight, coil to magnet ratio is to permit an equal number of coils on each one of three electrical phases to "fire" at the same time. The electrical "firing" of the coils at the same time is important to reduce the vibration of the machine and to have equally displaced voltage vectors. It is also important that the physical construction of the machine be such that the magnets 54 are equally spaced about the circumference of the end rotors 27 and 28 as well as the double sided rotor 13. In a similar manner, it is important that bobbin coil members 43 be equally spaced about the circumference of stators 12.

Referring next to FIG. 4, the arrangement of the rare earth magnets 54 with respect to the bobbin coils 43 is further illustrated. As shown there, the coils 43 of two adjacent stators are being swept by magnets 54 of three adjacent rotors 27, 28 and 13. The magnetic flux lines flow between the north and south magnets 54 and utilize soft steel plates 59 on the axially outer surfaces of rotors 27 and 28. In a similar manner a soft steel plate 59 is sandwiched in between the two sides of double-sided rotor 13. This configuration permits flux lines to travel between adjacent north and south magnetic poles on the same rotor, or on adjacent rotors, utilizing the soft steel plates 59 as return paths. Thus, flux lines flow from one south magnet through a plate 59 to the next north magnet located on a common rotor. The flux lines thereafter flow from one north magnet of this rotor to the south magnet of the adjacent rotor and thence through the return path formed by the soft steel sheet 59 of the latter rotor. As stated earlier, the centerlines of all magnets 54 are aligned along common longitudinal axes from one rotor to next. This configuration permits the flux linkages to travel between north pole and south poles at the maximum operating point $B_D$.

As will be apparent in FIG. 4, the magnetic flux lines are interrupted by bobbin coils 43 as the rotating magnets 54 on rotors 27, 28 and 13 spin. In a generator, the interruption results in the transformation of similar magnetic flux in the coil. The magnetic flux induced in the coil thereby causes a current to flow in the bobbin coil winding which translates to electrical energy.

In a motor configuration of the machine, electric power is applied to the bobbin coils which induces magnetic flux linkages in the coils. These linkages in the coil then repel the magnetic flux linkages of the rare earth magnets, and this repulsion causes a rotational movement of the rotors 27, 28 and 13.

It will be noted that the motor configuration of the present machine has no starting winding. The machine is therefore incapable of starting with full voltage applied to the coils when used in a motor configuration. Accordingly, the machine, when used in the motor configuration, should be started and accelerated by using a starting motor on the shaft of the machine, or by using a ramp-voltage to slowly ramp the machine from no rotation to rated rotational speed, or by equivalent means.

Figure 5:
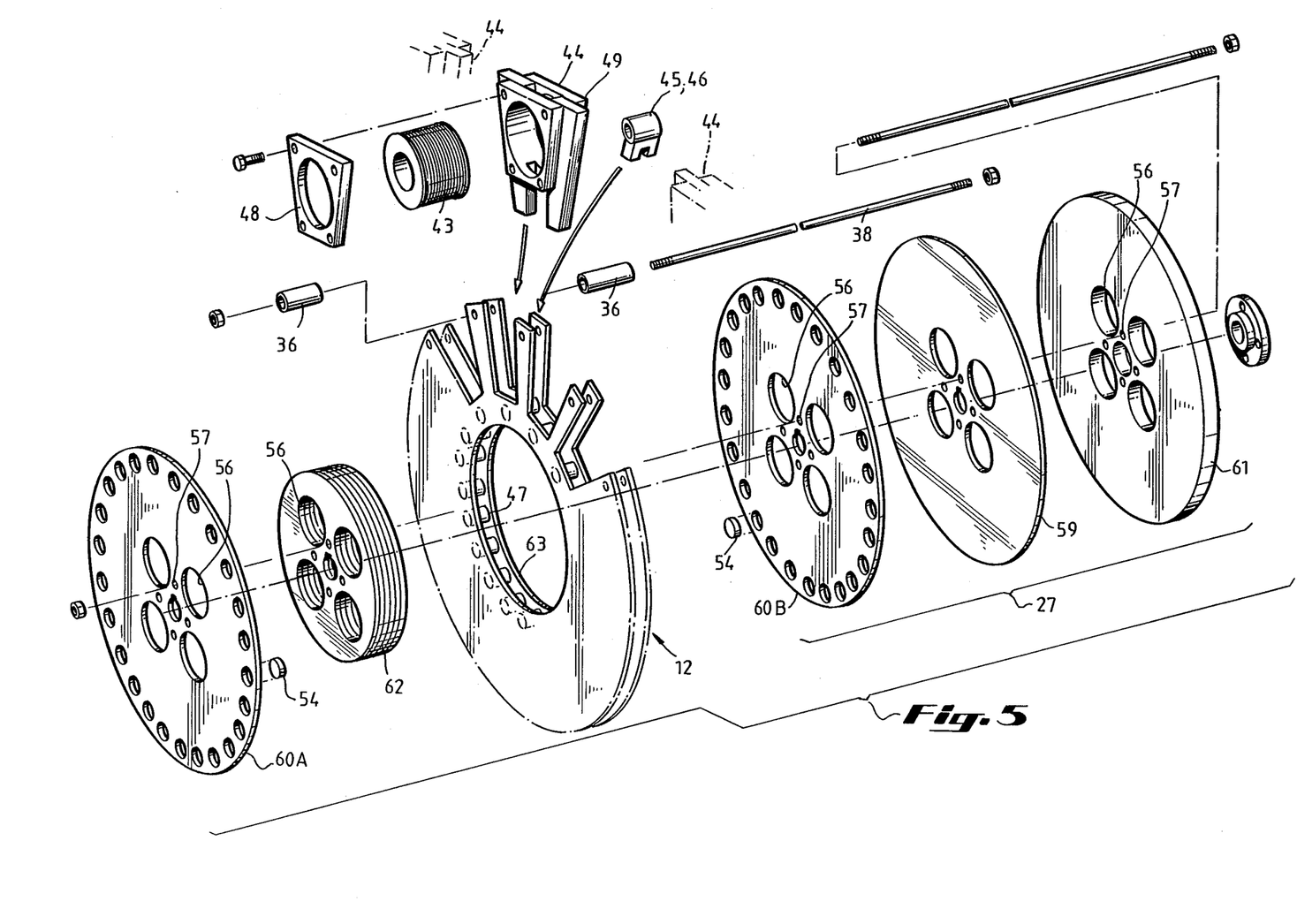
FIG. 5 is an exploded view of a stator assembly between an end-piece rotor and part of another rotor.
Figure 7:
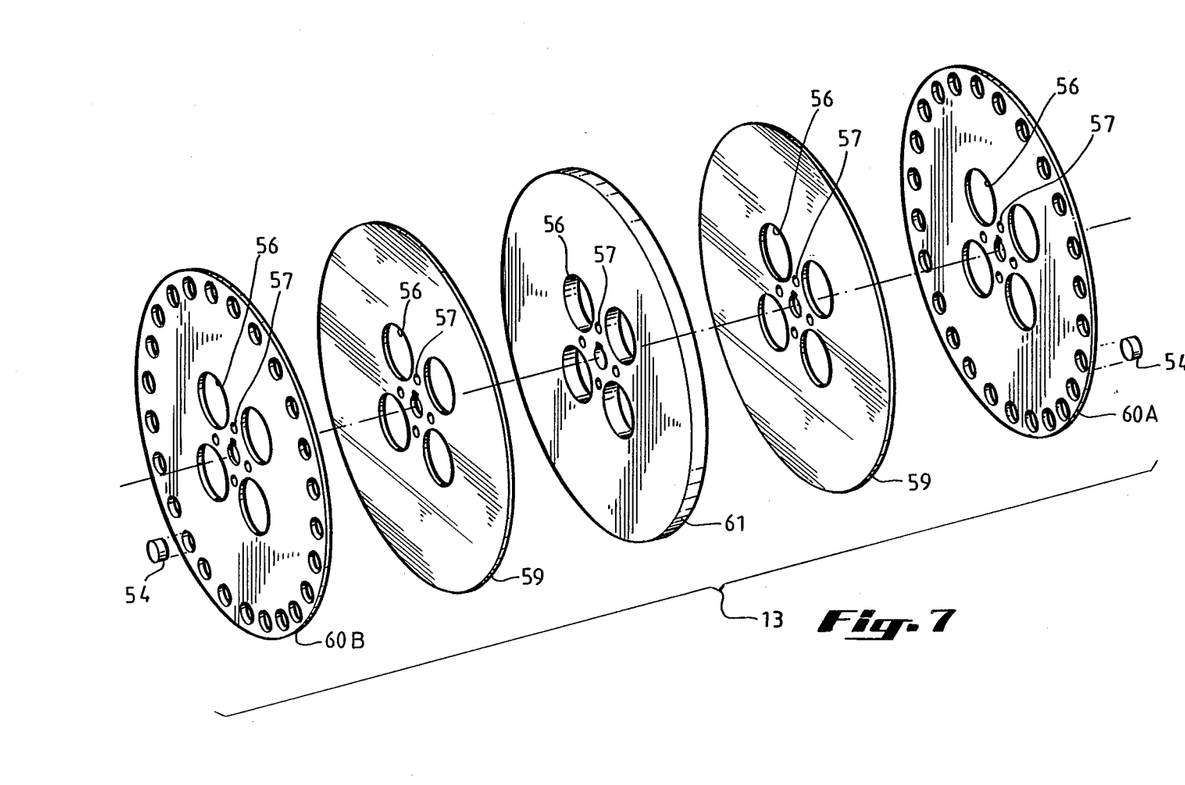
FIG. 7 is an exploded view of a double-sided central rotor 13.

Referring next to FIG. 5, an exploded view of a section of the machine is illustrated. End rotor 27 comprises an assembly of magnet embed plate 60B, soft steel plate 59 and spacer 55. Magnet embed plate 60 and spacer 55 are constructed of polycarbonate plastic in the preferred embodiment. The purpose of spacer 55 is to increase the spacing between steel plate 59 and other ferrous materials, thereby minimizing interference with the magnetic flux linkages. The soft steel plate 59, which serves as a return path for the magnetic flux linkages, is sandwiched between magnet embed plate 60B and spacer 55. The magnet embed plate 60 retains the rare earth magnets 54. The rare earth magnets 54 may be epoxied or glued into the plate 60. Rotor 28 in FIG. 1 is constructed in a similar manner as end piece rotating magnetic rotor 27; however, the steel plate 59 and magnet embed plate 60 are located on the opposite side of spacer member 55 in order to have the magnet 54 embedded in embed plate 60 adjacent the bobbin coils 43.

A double-sided magnetic rotor member 13 is constructed similar to end piece rotor 27; however, a soft steel plate 59 is located on either side and adjacent to spacer member 55. In a similar manner a magnetic embed plate 60 is located on either side and adjacent to the soft steel plate 59. This configuration results in a double-sided magnetic rotor, thus enabling the rare earth magnets 54 to be positioned adjacent to the stationary stator members 12 and the bobbin coils 43 on each stationary stator member 12.

Ventilation holes 56 are found on spacer 55, soft steel plate 59, magnet embed plates 60 and stator spacer 62. In a similar manner assembly holes 57 are found on spacer member 55, soft steel plate 59, magnet embed plates 60 and stator spacer 62. Thus, the overall rotating assembly is held together as a unitary assembly by using through-bolts extending through the holes 57 in all spacers 55, all steel plates 59, all magnet embed plates 60 and all stator spacers 62. The length of stator spacer 62 is sized to minimize the axial air gap between the bobbin coils 43 and the rare earth magnets 54. Thus, as the through-bolts are positioned through assembly holes 57 and the entire assembly is bolted and compressed together, the air gaps between the magnets and the bobbin coils can be assured.

The stator spacer 62 has an outside diameter which is sufficiently smaller than the inside diameter 63 of stator 12 to enable stator spacer 62 to rotate inside stator 12.

Referring next to FIG. 6, a connection diagram for the coils on each stator is illustrated. This diagram delivers equally displaced voltage vectors in a balanced three-phase system. While a wye-connection is described herein and shown in FIG. 6, a delta connection of the phases may be accomplished since six leads are wired to the exterior of the machine. Thus by providing jumpers on the exterior of the machine either a wye or delta connection configuration may be achieved. This is accomplished by wiring adjacent bobbin coils 43—i.e., adjacent coils along the same longitudinal axis in parallel. Thus, for a first phase bobbin coils 1' and 16', 6' and 21', 11' and 26', 3' and 18', and 9' and 24' are respectively wired in parallel as shown in FIG. 6. Other adjacent coils are similarly wired in parallel for the other two phases. This overall configuration results in voltage vectors $V_{L1}$, $V_{L6}$, and $V_{L11}$, shown in FIG. 6 adding up vectorally without any displacement vector for phase 1. The voltage vectors $V_{L3}$ and $V_{L9}$ add up vectorally with the displacement vectors cancelling each other.

In a analogous manner voltage vectors $V_{L2}$, $V_{L7}$, $V_{L12}$, $V_{L4}$, and $V_{L14}$ vectorally add to produce a voltage vector for phase 2. Further, voltage vectors $V_{L5}$, $V_{L10}$, $V_{L15}$, $V_{L13}$, and $V_{L8}$ vectorally add to produce a voltage vector for phase 3.

Equally displaced voltage vectors are achieved by wiring coils 1', 6' and 11' in series because they correspond physically and electrically to a zero or 180 electrical degree reference. Coils 2', 7' and 12' are wired in series because they correspond physically and electrically to an electrical angle of 72 degrees leading; and coils 5', 10' and 15' are wired in series because they correspond physically and electrically to an electrical angle of 72 degrees lagging.

The voltage vectors 3' and 9' respectively have an electrical angle of 36 degrees lagging and 35 degrees leading, therefore cancelling the displacement vector. Similarly, voltage vectors 4' and 14' each have an electrical angle of 36 degrees leading.

Similarly, voltage vectors 13' and 8' respectively have a lagging angle of 35 degrees In phase 2, coils 2', 7', and 12' add up vectorally without a displacement component to a total vector which is 72 degrees leading. Coils 4 and 14 are additionally added vectorally to the phase 2 vector. Since coils 4 and 14 are leading by 36 electrical degrees, they effectively "pull down" the vector sum, thus the phase 2 vector composed of coils 2', 7', 12', 4', and 14' produce a near perfect 60 degrees total vector angle. The same vector summing process takes place in phase 3 however coils 5', 10', 15', 13' and 8' are added vectorally to achieve a vector sum which is a near perfect 60 degrees lagging. By inverting the leads of phase 1 (thus a 180 degree phase reversal for phase 1) three balanced phases are achieved. These three balanced phases may be wired in either a wye configuration as shown in FIG. 6 or alternately in a delta configuration.

It is to be understood that the electrical coils on adjacent stators which aligned with and adjacent to the above-described coils have similar electrical angles. Thus, the sets of coils complement and aid the vectors and voltages generated by the above-described coils 1' through 15'.

It is to be understood that the key in achieving equally displaced voltage vectors is the use of a 72 degree lagging angle for coils 5', 10', and 15' and the use of the lagging 36-degree angle for coils 8', and 13' aid in the summing of a voltage vector with an electrical displacement of approximately 120 degrees from phase 1. Additionally, the use of a 72 degree leading angle for coils 2', 7' and 12' and the use of the leading 36 degree angle for coils 4' and 14' aid in the summing of a voltage vector with an electrical displacement of 120 degrees from phase 1 as well as 120 degrees from phase 3.

The following is the operating test data. With the machine operating as a generator and turning at 300 RPM and winding Wye Connected:

Frequency: 60 Hertz

With 97 three phase Delta connected load at unity power factor:

Current (in each phase): 1.25 amps

Total Power (real three phase): 270 VA

In the preferred embodiment the rare earth magnets envisioned by the inventors are neodymium-iron-boron magnets. However, the use of neodymium-iron-boron magnets is not considered a limiting factor.

In the preferred embodiment the use of tape-wound transformer iron, such as Metglass, as manufacturered by Allied Chemical or 3% silicon iron, is envisioned by the inventors as the preferred material for the bobbin cores. However, the use of 3% silicon iron is not considered a limiting factor.

Further modifications and alternative embodiments of the inventive apparatus and method will be apparent to those skilled in the art having the benefit of this disclosure. Accordingly, this description and the methods described herein are to be construed as illustrative only and for the purpose of teaching those skilled in the art the manner of carrying out the invention. Equivalent components and materials may be substituted for those specifically illustrated and described herein, and certain features of the invention may be utilized independently of the use of other features. All this will be apparent to those who are skilled in the art having the benefit of this disclosure.

We claim:

1. An axial air gap electrical machine suitable for use as an electrical motor or generator comprising:
   (a) a support and motor frame with two end plates;
   (b) a rotor shaft journaled at each end plate in said frame;
   (c) at least two stators uniformly spaced on said shaft between the end plates and supported by said frame around said shaft; each said stator having modular wire wound coils uniformly spaced about the outer circumference of said stator;
   (d) at least one two-sided rotor mounted on said shaft between said stators said rotor having two magnet embed plates each said embed plate having a plurality of permanent magnetic-discs uniformly spaced around the circumference of each said side of said plate with successive magnets having poles of opposite polarity facing toward said coils, said embed plates separated by two magnetic flux return plates and a non-ferrous spacer plate interdisposed between the flux return plates;
   (e) a separate end rotor at each end of said shaft said rotor interdisposed between the motor end plate and the stator adjacent said end plate, said rotor having one magnet embed plate, a flux return plate and a plurality of permanent magnetic-discs uniformly spaced around the circumference of the rotor and positioned to face toward said adjacent stator, successive magnets having poles of opposite polarity facing said coils, said flux return plates adjacent to the magnet embed plate and side opposite the coils; and
   (f) a plurality of dielectric spacers spaced along said shaft to space said rotors and said stators.

2. The electrical machine set forth in claim 1 wherein all of the rotors and stators are constructed of nonferrous dielectric materials with the exception of the magnetic flux return paths, the magnets, and the wirewound coil members.

3. The electric machine set froth in claim 1 wherein each module stator coil is wound about a cylindrical bobbin core, said bobbin core installed in the stator with its longitudinal axis parallel to the motor shaft axis.

4. The electrical machine set forth in claim 1 wherein the longitudinal centerlines of the stator member coils and the longitudinal centerline of the magnets are alligned.

5. The electrical machine set forth in claim 1 wherein the rare earth magnet members are cylindrical in shape with a diameter greater than the length.

6. The electrical machine set forth in claim 1 wherein there are fifteen (15) coils on each stator member, uniformly spaced about the circumference of the stator, and wherein there are twenty-four (24) rare earth magnets on each rotor uniformly spaced about the circumference of the rotor.

7. The electrical machine set forth in claim 1 wherein there are five (5) stator coils on each stator member for each eight (8) rare earth magnets on each rotor member.

8. The electrical machine set forth in claim 1 wherein adjacent coils or a stator member are wired in parallel, and each parallel combination is wired in series and interconnected to form a wye or delta electrical configuration, in a manner to achieve equally displaced voltage vectors 120 degrees apart; the equally displaced voltage vectors produced by vectorally adding the vectors in phase with each other and vectorally adding vectors with out-of-phase (complement) components to cancel such (unwanted and) out-of-phase (voltage) components and thus produce the desired voltage vector angle.

9. The machine set forth in claim 8 where the primary components of phase 1 are in phase and at zero degrees electrical angle, the primary components of phase 2 voltage vector are 72 electrical degrees leading, and the primary voltage vectors of phase 3 are 72 electrical degrees lagging; and wherein the secondary voltage vectors added to cancel unwanted components are 36 electrical degrees lagging and 36 electrical degrees leading.

10. A modular type three phase electrical machine suitable for use as a motor or generator comprising:
   (a) a rotatable shaft;
   (b) at least one circular disk-like dielectric rotor mounted on said shaft;
   (c) at least two separate circular disk-like dielectric stators mounted around said shaft adjacent and axially spaced from and on each side of said rotor, said stators also connected to each other by at least one rod;
   (d) a plurality of permanent magnets mounted around the periphery of each side of said rotor uniformly spaced around the circumference of the rotor and facing toward said adjacent stator, successive magnets in said periphery having poles of opposite polarities facing toward said coils to sweep past the coils of the stator, each said side of said stator also having a magnetic flux return path for the permanent magnet associated with the side;
   (e) a plurality of removable and retrievable bobbin type coils mounted around the periphery of said stator and facing toward said magnets, the ratio of said coils to said magnets being 5 to 8; and
   (f) a plurality of dielectric spacers spaced along said rotatable shaft to space said rotor and said stators.

11. An electrical machine as set forth in claim 10 in which each dielectric rotor and stator is made of a synthetic polymer.

12. An electrical machine as set forth in claim 10 in which each dielectric rotor and stator is made of a polycarbonate.

13. An axial air-gap three phase electrical machine of modular design for use as a motor or a generator comprising:
   (a) two axially spaced end supports;
   (b) a rotatable shaft journaled at each end in said end supports;
   (c) a plurality of dielectric disk-like stators spaced axially along said shaft and transverse to said shaft;
   (d) a plurality of dielectric, disk-like rotors axially spaced along and mounted on said shaft, said rotors being interleaved with said stators to rotate with said shaft relative to said stators;
   (e) at least one connecting member extending between said end supports to assemble and support said stators while enabling said shaft and said rotors to rotate relative to said stators;
   (f) a plurality of removable and retrievable bobbin type wound conductor coils mounted in each said stator in spaced relation around said stator;
   (g) a plurality of permanent magnets mounted on each said rotor in accurately an equally spaced relation around said rotor to sweep past the coils of an adjacent stator upon rotation of said shaft, adjacent said magnets on each said rotor arranged to face poles of opposite polarities toward the coils of the adjacent stator;
   (h) each coil of each stator being in axial alignment with a coil of each other stator and each magnet of each rotor being in axial alignment with a magnet of each other rotor, the number of coils on each stator to the number of magnets on each rotor being in the ratio of 5 to 8;
   (i) a magnetic flux conductor member attached to the side of each said rotor away from its adjacent said stator to provide a flux return path for the magnets on said rotor; and
   (j) dielectric spacer members along said shaft to maintain axial spacings between said stators and said rotors.

14. The electrical machine of claim 13 in which the rotor between each pair of adjacent stators is a double sided rotor comprising two rotors and a dielectric spacer between said rotors.

15. The electrical machines of claim 13 in which the dielectric components are made of a polycarbonate.

16. An electrical machine as set forth in claim 13 in which each said rotor has 24 magnets and each said stator has 15 coils.

* * * * *

UNITED STATES PATENT AND TRADEMARK OFFICE
CERTIFICATE OF CORRECTION

PATENT NO. : 4,866,321

DATED : September 12, 1989

INVENTOR(S) : Hubert J. Blanchard and Cornelius J. Fruge

It is certified that error appears in the above-identified patent and that said Letters Patent is hereby corrected as shown below:

Column 9, line 17, delete "or" and insert therefor --on--.

Signed and Sealed this

Sixteenth Day of October, 1990

*Attest:*

HARRY F. MANBECK, JR.

*Attesting Officer*      *Commissioner of Patents and Trademarks*